United States Patent
Doi et al.

(10) Patent No.: US 6,552,825 B1
(45) Date of Patent: Apr. 22, 2003

(54) DATA COMMUNICATION APPARATUS HAVING COMMON MEMORY FOR STORING VIDEO AND AUDIO DATA

(75) Inventors: Mitsuaki Doi, Chigasaki (JP); Masatsugu Okuyama, Hiratsuka (JP)

(73) Assignee: Matsushita Graphic Communication Systems, Inc., Tokyo (JP)

( * ) Notice: Subject to any disclaimer, the term of this patent is extended or adjusted under 35 U.S.C. 154(b) by 0 days.

(21) Appl. No.: 07/907,472

(22) Filed: Jul. 1, 1992

(30) Foreign Application Priority Data

Jul. 2, 1991 (JP) .............................. 3-161470

(51) Int. Cl.[7] .............................. H04N 1/40
(52) U.S. Cl. ...................... 358/404; 358/444
(58) Field of Search ................ 358/437, 404, 358/436

(56) References Cited

U.S. PATENT DOCUMENTS

| | | | |
|---|---|---|---|
| 4,712,139 A | * 12/1987 | Kato | .......................... 358/257 |
| 4,907,094 A | * 3/1990 | Mishima et al. | |
| 4,991,169 A | * 2/1991 | Davis et al. | .................. 370/77 |

FOREIGN PATENT DOCUMENTS

JP  336868  2/1991

* cited by examiner

*Primary Examiner*—Vit Miska
(74) *Attorney, Agent, or Firm*—Israel Gopstein Clark & Brody

(57) ABSTRACT

A data communication apparatus such as a facsimile apparatus having an automatic telephone message recording function, having a common memory for storing video and audio data that have been received or are to be transmitted, enables selection of a method of memory management whereby the memory space is divided at a boundary address into two regions which respectively store video data and audio data and a method whereby the memory space is not so divided, but the video data and audio data are written into addresses which successively increase from respectively opposite ends of the memory space. Remaining amounts of memory capacity which can be used to store video and/or audio data can be displayed as respective numbers of standard document pages and telephone calls, the latter representing standard-duration recording intervals. In addition, a boundary address setting mode can be established in which the respective sizes of the video and audio regions for respectively different boundary address values are displayed as numbers of standard document pages and telephone calls.

8 Claims, 8 Drawing Sheets

PRIOR ART
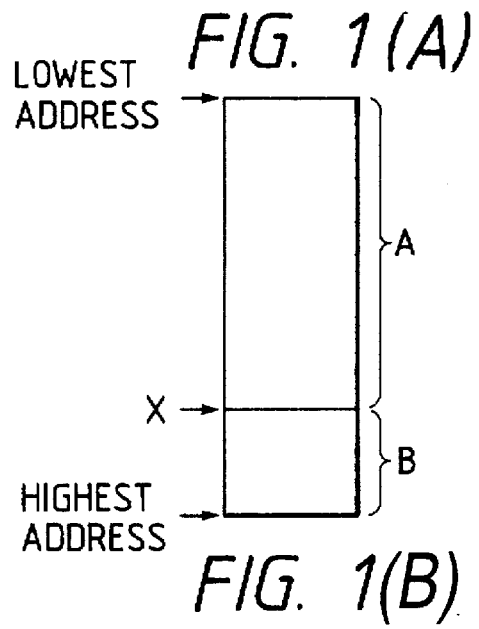
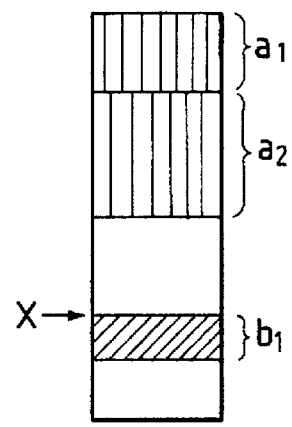
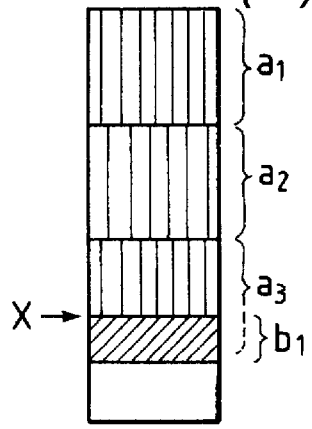

FIG. 6

CONTENTS OF SETTING TABLE 6C

| STANDARD RECORDING INTERVAL | AMOUNT OF DATA IN ONE STANDARD RECORDING INTERVAL | AMOUNT OF DATA IN ONE STANDARD DOCUMENT PAGE | | | |
|---|---|---|---|---|---|
| | | WHEN MEMORY IS NOT DIVIDED | WHEN MEMORY IS DIVIDED INTO VIDEO, AUDIO REGIONS | | |
| | | | PATTERN (a) | PATTERN (b) | PATTERN (c) |
| | | NUMBER OF CALLS, NUMBER OF PAGES | BOUNDARY ADDRESS X NUMBER OF CALLS, NUMBER OF PAGES | BOUNDARY ADDRESS X NUMBER OF CALLS, NUMBER OF PAGES | BOUNDARY ADDRESS X NUMBER OF CALLS, NUMBER OF PAGES |
| 100 SEC. | | | | | |
| 60 SEC. | | | | | |
| 30 SEC. | | | | | |

FIG. 13

```
REMAINING STORAGE
CAPACITY

MESSAGE
RECORDING        3 CALLS (60 SECONDS)

DOCUMENTS              60 PAGES
```

FIG. 14

```
REMAINING STORAGE
CAPACITY

MESSAGE
RECORDING        4 CALLS (60 SECONDS)
                        OR
DOCUMENTS              80 PAGES
```

DATA COMMUNICATION APPARATUS HAVING COMMON MEMORY FOR STORING VIDEO AND AUDIO DATA

BACKGROUND OF THE INVENTION

1. Field of the Invention

The present invention relates to a data communication apparatus for use in communicating video and audio data, and in particular to a data communication apparatus such as a facsimile apparatus, having a memory which is used in common for temporarily storing video and audio data which have been received or are to be transmitted.

2. Description of the Related Art

In the prior art, as described for example in Japanese Patent Laid-open No. 3-36868, a data communication apparatus is known whereby a single memory is used in common for storing video data and audio data that have been received or are to be transmitted. Diagram (a) of FIG. 1 illustrates the memory arrangement of such a prior art apparatus. The memory space is divided into a video region A and an audio region B which are respectively reserved for temporarily storing video and audio data. The user of the apparatus can establish a boundary address X in accordance with the memory usage condition, whereby the respective sizes of the video region A and audio region B can be increased or decreased.

For example in the case of a user who does not use an unattended telephone message recording function with such an apparatus, the boundary address X could be set to the highest address value of the memory, so that the entire memory space is allocated to the video region A. Conversely in the case of a user who does not use video data sending and receiving (e.g. facsimile) functions with such an apparatus, but who makes frequent use of an unattended telephone message recording function, the boundary address X can be set as the lowest address of the memory, so that the entire memory space is allocated as the audio region B.

It should be understood that the term "recording" as used herein refers to the storage of an audio telephone message in a memory, after conversion to digital data.

When the video region A is completely empty, and the memory is to be used for video data sending or receiving operations, then the video data of document pages which have been received or document pages which are to be transmitted are thereafter stored in a set of addresses successively extending from the lowest address number of the memory. If at the stage when such video data have not yet been outputted from the memory it becomes necessary to store new video data (i.e. for document pages which have been received or are to be transmitted) then the new data are stored in addresses which successively increase from the highest one of the addresses in which video data have already been stored.

If the audio region B is completely empty and audio data are received, then that data are stored at addresses which successively extend from the lowest address of the audio region B. When audio data are received thereafter, the new data are stored in addresses which successively increase following the highest one of the addresses in which audio data have already been stored.

Diagram (b) of FIG. 1 illustrates a condition in which sets of video data a1 and a2, and the set of audio data b1 have been stored in the memory. The memory control section of such a data communication apparatus is provided with a memory management table for use in managing the utilization of the memory. The management information consists of the initial address and final address of each set of video data which have been stored in the memory (or, for each set of video data, the initial address and the number of bytes constituting the video data), flags for distinguishing different types of data (i.e. video or audio), the amount of usable storage capacity of the memory which remains available for storing video data and audio data, and the boundary address X. Each of these items of memory management information is registered in the memory management table. When data stored in the memory are outputted (i.e. to be transmitted, recorded or reproduced), the memory management information relating to that data are deleted from the memory management table. Thus the amount of remaining memory capacity, as registered in the management table, is increased by an amount corresponding to the storage range of the outputted data. The memory control section can thus manage memory write and read operations by looking up the management table.

However with such a prior art configuration, the following problems arise:

(a) Even if the user attempts to set the boundary address X at an optimum position with regard to the usage conditions of the apparatus, problems arise because there is no clearly defined target value for setting the boundary address. Moreover there is no simple way for the user to confirm that the position which has been set (within the memory space) for the boundary address is appropriate.

(b) When data transmission or receiving is being executed using the memory, then in order to prevent communications from being interrupted as a result of insufficient memory space, it would be convenient for the user to be able to confirm the amount of remaining memory capacity. However with such a prior art type of data communication apparatus, the user is not provided with information to enable the remaining memory capacity to be easily confirmed.

Moreover as shown in diagram (c) of FIG. 1, in a case in which the video region A has become insufficient, but there is some available memory capacity remaining in the audio region B, it is not possible to obtain additional video data storage capacity by going beyond the memory region A.

SUMMARY OF THE INVENTION

It is an objective of the present invention to provide a data communication apparatus having a memory which is used in common for storing video data and audio data, whereby setting of a boundary address at an appropriate position for defining a video region and an audio region within the memory and also confirmation of amounts of remaining memory capacity, can be easily performed, and further whereby the efficiency of utilization of the common memory can be improved by comparison with the prior art.

To achieve the above objectives, a data communication apparatus according to the invention converts an amount of memory space which can be used for storing video data into an equivalent number of standard document pages, and displays that number of pages. Similarly, an amount of space that can be used for storing audio data is displayed as an equivalent number of telephone calls, i.e. telephone messages. The user without specialized knowledge can thereby more readily understand the amounts of memory space when thus expressed as a number of pages and number of telephone calls, than would be the case if these amounts were displayed in the usual units of bytes or kilobytes.

More specifically the present invention provides, in a data communication apparatus including communication means for transmitting and receiving video data and audio data, the video data being derived from documents, a memory for storing at least video data and audio data received by the communication means, memory control means for executing management of utilization of the memory and for controlling data write and read operations of the memory, and data display means the improvement comprising display control means for controlling the data display means to display first memory capacity information representing an amount of capacity available in the memory for storing video data and second memory capacity information representing an amount of capacity available in the memory for storing audio data;

the display control means comprising means for expressing the first memory capacity information as a number of first data units, each of the first data units consisting of am amount of data corresponding to one standard document page, and for expressing the second memory capacity information as a number of second data units, each of the second data units consisting of an amount of data corresponding to one fixed-duration telephone message, and means for controlling the display means to display the number of first data units and the number of second data units.

With such an apparatus, the memory space of the memory can be divided into a video region which is reserved for storing video data and an audio region which is reserved for storing audio data, with a boundary between the video region and audio region being defined by a boundary address, with the first memory capacity information being an amount of capacity of the video region and the second memory capacity information being an amount of capacity of the audio region.

Moreover such an apparatus can further include means for establishing a boundary address setting mode of operation wherein one of a plurality of respectively different values of the boundary address can be selectively established by a user, and wherein the display means is controlled to display during the boundary address setting mode, for each of the plurality of boundary address values, a corresponding amount of capacity of the video region, expressed as a number of the units of document pages, and a corresponding amount of capacity of the audio region, expressed as a number of the units of telephone messages, the display means being further controlled to indicate the boundary address value which is currently selected.

Such an apparatus may also include means for establishing a residual capacity display mode of operation wherein an amount of capacity that is currently vacant in the video region is displayed in the units of standard document pages and an amount of capacity that is currently vacant in the audio region is displayed in the units of telephone messages.

In general, the units of telephone messages will respectively correspond to standard recording intervals for storing audio data in the memory, and the apparatus may further comprise means for establishing a recording interval setting mode of operation wherein one of a plurality of respectively different values of the standard recording intervals can be selectively established by a user, and wherein the display means is controlled by the display control means to display during the recording interval setting mode, in correspondence with each of the different standard recording interval values, a corresponding value of the second memory capacity information, expressed as a number of the units of telephone messages, and to display an indication of one the standard recording interval value which is currently selected.

Such an apparatus can alternatively be operated such that video data which are successively written into the memory are written into addresses which successively change in a direction from a first one of a highest address and a lowest address of the memory towards a second one of the highest and lowest addresses, and wherein audio data which are successively written into the memory are written into addresses which successively change in a direction from the second one of the highest and lowest addresses of the memory towards the first one of the highest and lowest addresses. In that case, since there is no fixed boundary between the video and audio storage regions, greater flexibility of memory utilization becomes possible.

BRIEF DESCRIPTION OF THE DRAWINGS

FIGS. 1(a)–1(c) are diagrams for illustrating memory usage management in a prior art type of data communication apparatus;

FIG. 6 illustrates registered contents of a setting control table;

FIG. 13 shows a display which is produced in the residual memory capacity display mode, in the case of a method of memory utilization management in which the memory space is divided into a video region and audio region; and FIG. 14 shows a display which is produced in the residual memory capacity display mode, in the case of a method of memory utilization management in which the memory space is not divided into a video region and audio region.

DESCRIPTION OF PREFERRED EMBODIMENTS

Figure 2:
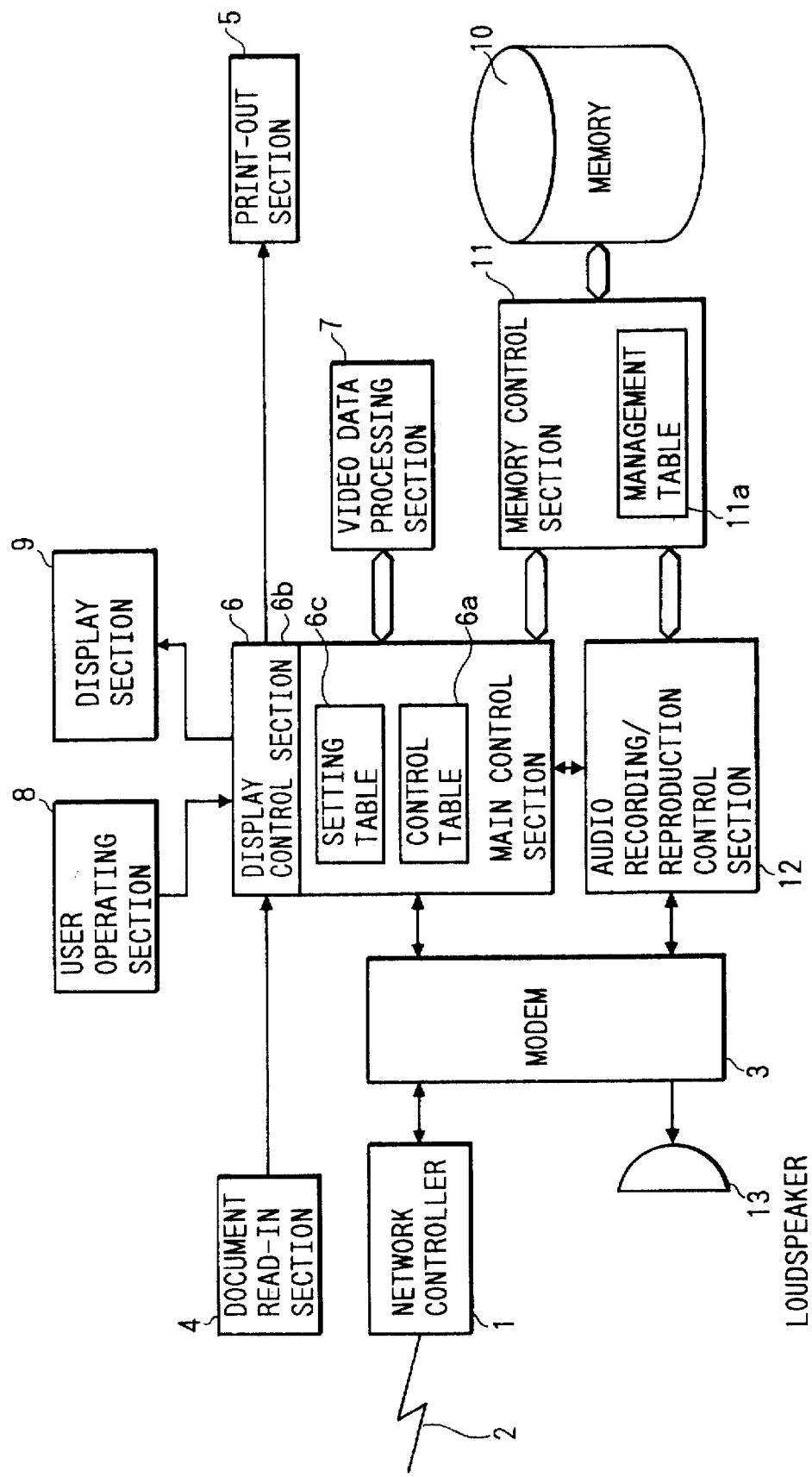
FIG. 2 is a block diagram of an embodiment of a data communication apparatus according to the present invention.

FIG. 2 is a general block diagram of an embodiment of a data communication apparatus according to the present invention. This embodiment is a facsimile apparatus which is also provided with an unattended telephone (audio) message recording function, whereby an incoming telephone call can be automatically recorded during a fixed-duration recording interval. Numeral 1 denotes a network control section through which the apparatus shown in the drawing (referred to in the following as the local apparatus) is connected to a telephone line 2. Numeral 3 denotes a modem which executes demodulation of a video data signal received from the line 2 or modulation of video data that are to be transmitted via the line 2, and also serves to convert incoming audio signals to (digital) audio data, and to convert (digital) audio data to analog signal form. 4 denotes a document read-in section which scans each page of a document which is to be transmitted, to convert the page contents to video data. 5 denotes a document printing section, which prints out the contents of received video data. Numeral 6 denotes a main control section, for controlling the overall operation of the local apparatus, including the facsimile operation sequence etc. A video processing section 7 executes processing such as compression and expansion of video data. 8 denotes a user operating section, provided with switches etc. which can be actuated by the user, and 9 denotes a display section. An audio recording and reproduction control section 12 serves to control the handling of audio messages that are to be transmitted or have been received. A memory 10 is used in common for audio and video data. In this embodiment, video data received from the telephone line, and also video data which are to be transmitted via the telephone line, can be temporarily stored in the memory 10, as also can audio data which have been received via the telephone line. The memory 10 is controlled by a memory control section 11 which executes management of memory utilization and controls the storing and reading of video and audio data into/out of the memory 10. The memory control section 11 includes a management table 11a, which serves to hold information that is used in memory management, such as the respective amounts of memory capacity which remain in an audio region and video region of the memory space of the memory 10, as described hereinafter. A loudspeaker 13 audibly reproduces messages which are received from the line 2 or are generated from audio data read out from the memory 10.

The main control section 6 includes a control table 6a which holds data relating to overall control operations, and a display control section 6b for controlling the display section 9 to display various information as described hereinafter, including remaining amounts of memory capacity of the memory 10. The main control section 6 further includes a setting table 6c, which holds information relating to various parameter values which can be selectively set by the user by utilizing the operating section 8.

The operation of this embodiment is as follows.

(a) Facsimile Receiving

The main control section 6 controls a facsimile preliminary procedure, acting through the modem 3 and the network control section 1, and thereafter sends the video data received from the telephone line 2 (after demodulation by the modem 3) to the video processing section 7. After executing expansion processing of the video data to a form suitable for print-out, the data are sent to the document printing section 5 to be printed. On completion of receiving the video data, the main control section 6 executes a facsimile post-procedure, and disconnection from the line 2. The above operations are for the case of normal facsimile receiving, however "memory receiving" by storing video data in the memory 10 is also possible.

In memory receiving of video data, the main control section 6 causes the video data which have been demodulated by the modem 3 to be converted by the video processing section 7 into suitable form for writing into the memory 10. The main control section 6 then transfers the video data to the memory control section 11, to be written into the memory 10. At this time, the memory control section 11 monitors the storage range of the video data which are written into the memory 10, and updates the contents of the management table 11a in accordance with the monitoring results. The memory control section 11 thereby determines the amount of residual capacity in the memory 10 which can be used for video data storage, and if that amount is found to have reached zero, then the memory control section 11 notifies the main control section 6 of that fact. The main control section 6 then executes control to interrupt receiving of the video data.

When video data that have been stored in the memory 10 are to be printed out, the main control section 6 (acting through the memory control section 11) causes the video data to be read out from the memory 10, and the data are then converted (expanded) by the video processing section 7 into suitable form for printing. The data are then transferred to the document printing section 5 to be printed out. The memory control section 11 then designates the storage range in the memory 10 from which the video data were read out as being a vacant region, and updates the amount of video data remaining memory capacity accordingly. That amount is held in a register of the management table 11a.

(b) Facsimile Transmission

After establishing a connection through the telephone line 2 to the opposite facsimile apparatus (i.e. the receiving apparatus), and executing a facsimile preliminary procedure, the main control section 6 activates the document read-in section 4 to transfer thereto the video data obtained from the document sheets that are to be transmitted. The video data are then converted by the video processing section 7 into suitable format for transmission (i.e. by compression encoding), and the resultant video data are modulated by the modem 3 and sent to the line 2. After completing transmission of the video data for all of the document sheets, the main control section 6 executes the facsimile post-procedure, followed by disconnection from the line 2.

The above describes the normal form of facsimile transmission. However "memory transmission" is also possible. In that case, the main control section 6 controls the document read-in section 4 to read in the video data from the document sheets which are to be transmitted, and the data are then converted by the video processing section 7 into suitable format for storage in the memory 10 (i.e. by compression encoding) and the resultant video data are then stored in the memory 10 by the memory control section 11. At that time, the storage range of the video data which are written into the memory 10 is monitored by the memory control section 11, and the contents of the management table 11a are updated in accordance with the monitoring results. The memory control section 11 thereby determines the amount of residual capacity in the memory 10 which can be used for video data storage, and if that amount is found to have reached zero, then the memory control section 11 notifies the main control section 6 of that fact. The main control section 6 then executes control to interrupt the transfer of video data thereto.

At the time of subsequently transmitting the video data that have thus been stored in the memory 10, the main control section 6 causes the memory control section 11 to read out the video data from the memory 10, and the data are then converted by the video processing section 7 into a suitable format for transmission. The resultant data are then modulated by the modem 3 and sent to the line 2 to be transmitted. The memory control section 11 then designates the storage range in the memory 10 from which the video data were read out as being a vacant region, and updates the amount of video data remaining memory capacity (held in the management table 11a) accordingly.

(c) Unattended Telephone Message Recording

In this form of operation, when a (audio) telephone call is received, the main control section 6 causes the received audio signal to be transferred through the modem 3 (and so converted to digital data) to the audio recording and reproduction control section 12. After the audio recording and reproduction control section 12 converts the audio data to a suitable format for storage in the memory 10, the audio data are written into that memory. At that time, the storage range of the audio data thus written in, and the remaining usable memory capacity, are monitored by the memory control section 11, and the contents of the management table 11a are updated accordingly.

When audio data that have been stored in the memory 10 are to be reproduced, to be audibly outputted from the loudspeaker 13, the main control section 6 causes the memory control section 11 to read out the required data from the memory 10 and the data are then converted into (digital) audio data form by the audio recording and reproduction control section 12, then transferred through the modem 3 to the loudspeaker 13.

The memory control section 11 then designates the storage range in the memory 10 from which the audio data were read out as being a vacant region, and updates the amount of audio data remaining memory capacity (held in the management table 11a) accordingly.

In the following, the method of managing the memory 10, the allocation of memory regions, the setting of a standard recording tint for each telephone call, and the display of residual memory capacity, will be successively described.

(a) Methods of Memory Utilization Management

With this embodiment of the present invention, two types of memory utilization management for the memory 10 are available, and either of these methods can be selected by the user, by designating the required method through the user operating section 8.

Figure 3:
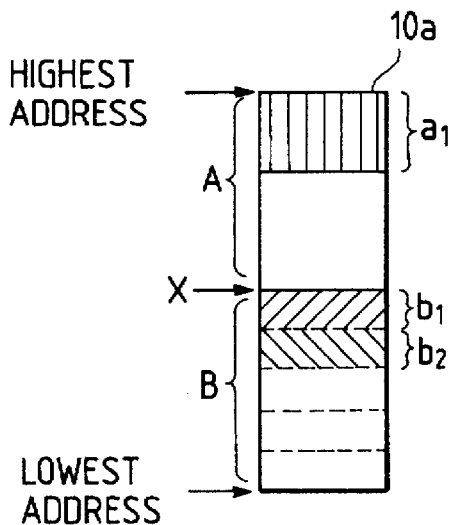
FIG. 3 is a diagram for illustrating data held in a memory space which is divided into video data and audio data regions.

The first method of memory utilization management is basically similar to that which is described in Japanese Patent Laid-open No. 3-36868. With that method, as shown in FIG. 3, the memory space 10a of the memory 10 is divided into a video region A and an audio region B by a boundary address X. In the case of the video region A for example, video data $a_1$ are stored in addresses which successively increase from the highest address of the memory space 10a towards the boundary address X. When these video data are outputted from the memory, the storage range of the outputted data is then designated as a vacant region. When vacant regions arise very frequently, then priority is given to the vacant region having the highest address, in assigning a region for storing the next incoming video data. In the case of the audio region B in the example of FIG. 3, the sets of audio region data designated as $b_1$, $b_2$ have been stored in addresses which successively increase from the boundary address X towards the lowest address of the memory 10. When stored audio data are read out from the memory, the corresponding storage range is assigned as an empty region, and can thereafter be used to store the next incoming audio data.

Figure 4:
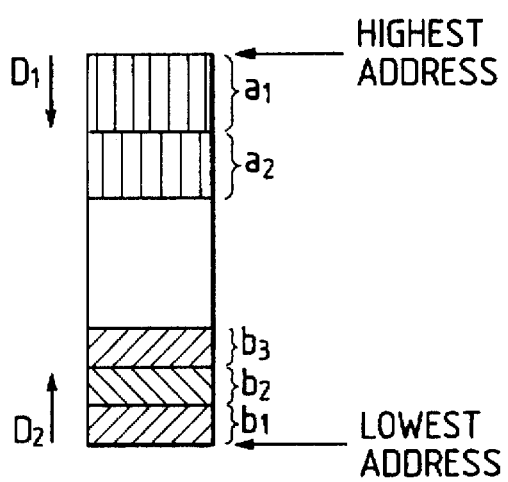
FIG. 4 is a diagram for illustrating data held in memory space which is not divided into video data and audio data regions.

With the second method of memory utilization management, instead of executing region allocation as described for the first method above, data are allocated as illustrated in the example of FIG. 4. Here, the video data such as the sets of video data $a_1$, $a_2$ are stored in addresses which sequentially increase from the highest address of the memory space 10a towards the minimum address of the memory space, as indicated by the arrow $D_1$. On the other hand, the audio data (for example the sets of data $b_1$, $b_2$, $b_3$) are stored in addresses which sequentially increase from the minimum address of the memory space 10a, as indicated by the arrow $D_2$. When stored video data are read out from the memory 10, the corresponding storage range is reassigned as a vacant region. When new video data are to be stored in the memory, the new data are written into addresses which begin from a position that is as close as possible to the maximum address of the memory space 10a. If there are a plurality of vacant regions, then priority is given to the vacant region which is closest to the maximum address of the memory space 10a, for writing in the next incoming video data.

In the case of audio data, when stored audio data are read out from the memory 10, the corresponding storage range is reassigned as a vacant region. When new audio data are to be stored in the memory, the new data are written into addresses (i.e. of a vacant region) which begin from a position as close as possible to the lowest address of the memory space 10a. If there are a plurality of vacant regions, then priority is given to the vacant region which is closest to the lowest address of the memory space 10a, for writing in the new audio data.

With the first memory utilization management method described above, when there is no longer any vacant space remaining in one of the regions A and B, then even if there is vacant space in the other one of the regions A, B, that space cannot be used for storing new data. For example if the video region A becomes full and then new video data is received, which is to be stored in the memory, then even if there is some vacant space available in the audio region B, that space cannot be used for the new video data.

With the second memory utilization management method described above, however, so long as there is any vacant space remaining in the memory 10, all of the space can be used for storing data, irrespective of whether that is audio data or video data. THus the entire capacity of the memory 10 can be fully utilized. This is a basic advantage of the second method.

If the first method described above is selected, then as described in Japanese Patent Laid-open No. 3-36868, in the special case in which the audio region B is entirely empty but there is no vacant space remaining in the video region A, then it becomes possible to store video data within the audio region B.

The memory control section 11 contains management information for implementing one of the two methods of memory usage described above, held in the management table 11a. That management information can for example consist of address information for managing the memory locations which hold video data or audio data, flag information for indicating the type of data stored i.e. video or audio, information concerning remaining amounts of memory capacity, information for indicating the memory management method that is being utilized, and (if the first memory management method described above is used) the boundary address between the video region and audio region. If the first memory management method described above is selected for use, then the amount of remaining capacity of the audio region and remaining capacity of the video region are managed respectively separately.

With this embodiment, one of a plurality of memory region allocation patterns can be selected by the user if the first management method is utilized. A region allocation pattern signifies the manner in which the memory space is divided between the audio and video regions, and is determined by the boundary address X. With this embodiment, the three types of region allocation pattern shown in diagrams (a), (b) and (c) of FIG. 5 respectively are provided beforehand. The user can select one of these three patterns, to thereby determine the boundary address X, as described hereinafter.

For the purposes of setting the boundary address X and displaying the remaining amounts of memory capacity, the video data and audio data are expressed in respectively different data units, for greater ease of understanding by the user. In this embodiment, the video data unit is the a fixed number of bytes, corresponding to one standard document page, i.e. the maximum amount of memory capacity which can be used to store video data, or the amount of memory capacity that is currently empty and can be used to store video data, are converted into an equivalent number of units of standard document pages for the purpose of displaying that amount of memory capacity. Similarly, an audio data unit is utilized for display purposes. This unit is the amount of data that is written into the memory during a standard audio recording interval, which is the duration that is allocated to each received telephone call for storing contents of the call (converted into digital data form) in memory. In the preferred embodiment, a plurality of values of standard audio recording interval are provided, from which the user can select an appropriate value. In the embodiment, specific interval values are 100 seconds, 60 seconds and 30 seconds.

The setting table 6c of the main control section 6 is configured as shown in FIG. 6, the contents being:
(1) Memory setting information. This includes the amount of data constituting the video data unit and the amount of data constituting the audio data unit (three different values for which can be selected in accordance with a selected value of standard recording interval).
(2) For the case in which the memory space is not divided into an audio region and video region by a boundary address, the storage capacity of the memory expressed as a number of video data units, and also expressed as a number of audio data units (for each of the possible standard audio recording interval values which can be selected).
(3) For the case in which the memory space is divided into an audio region and video region by a boundary address X, for each of the possible positions of the boundary address which can be selected (i.e. for each of the region allocation patterns (a), (b), (c) which can be selected, with this embodiment) the capacity of the video region expressed in units of standard document pages and the capacity of the audio region expressed in units of telephone calls (i.e. standard recording intervals). Since in this embodiment there are three possible standard audio recording interval values, the storage capacity of the audio region can be correspondingly expressed as three different sets of audio data units, for each of the three possible boundary address values, as shown in FIG. 6.

Prior to operation of the apparatus, the above information (1), (2) and (3) are stored in the setting table 6c.

The procedure for setting the value of the standard audio recording interval is as follows.

Figures 7, 8:
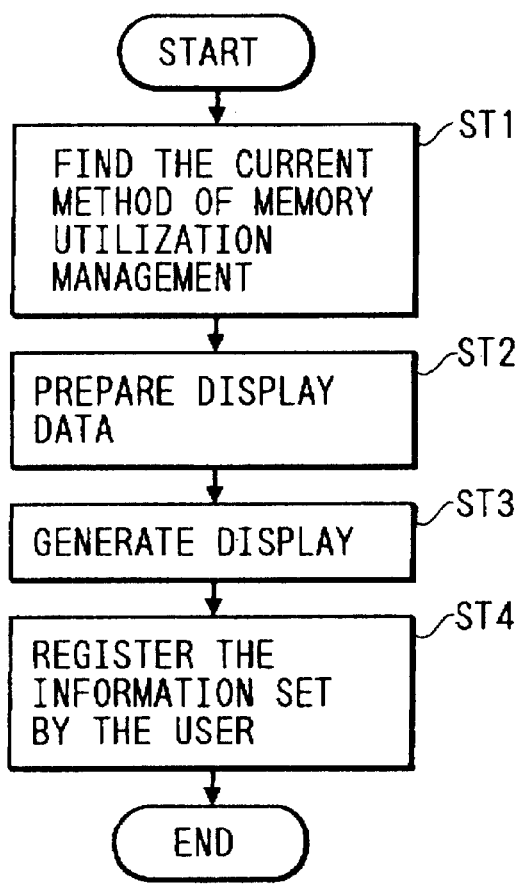
FIG. 7 is a flow chart of processing in a standard audio recording interval setting mode.
FIG. 8 shows an example of a display which is produced in the standard audio recording interval setting mode.

Firstly, the user actuates the user operating section 8 to designate the standard audio recording interval setting mode. When that is done, the display control section 6b executes a sequence of operations which is illustrated in the flow diagram of FIG. 7. Firstly, the display control section 6b refers to the control table 6a, to find the memory management method that is currently set (step ST1). If it is found that the first method of memory utilization management described hereinabove has been set (i.e. as illustrated in FIG. 3) in which the memory space is divided into a video region A and audio region B at the boundary address X, then information corresponding to the memory region allocation pattern that is currently set (i.e. one of the patterns (a), (b), (c) of FIG. 5) is read out from the setting table 6c. Display data are then generated (step ST2), in accordance with the currently set region allocation pattern, for displaying the respective storage capacities of the video region A and audio region B in units of standard document pages and units of standard audio recording intervals, respectively. The resultant display 21 that is produced by the display section 9 (step ST3) is illustrated in FIG. 8, for the case in which the region allocation pattern (b) of FIG. 5 has been set. Since there are three possible values of standard audio recording interval, the size of the audio region B is expressed in three different ways, as shown. Thus there are three rows of values (corresponding to the three possible values of standard audio recording interval) and two columns of values (for audio data and video data respectively) appearing on the display 21. The user first operates a cursor key of the user operating section 8 such as to move a displayed cursor 25 to designate the one of the three standard audio recording interval values that is to be selected. The user then actuates a selector key of the user operating section 8, and the selected standard audio recording interval information is thereby set, i.e. registered in the control table 6a. In addition, the value of amount of data corresponding to the selected standard audio recording interval is read out from the setting table 6c, and is registered in the management table 11a of the memory control section 11 (step ST4).

In this example, the user can thereby set a standard audio recording interval value to enable storing simultaneously messages of a maximum of 3 calls (with a standard recording interval of 100 seconds for each call), 5 calls (with a standard recording interval of 6 seconds), or 10 calls (with a standard recording interval of 30 seconds). In each case, a maximum video data storage capability of 100 standard document pages is available.

Figures 9A, 9B, 9C:
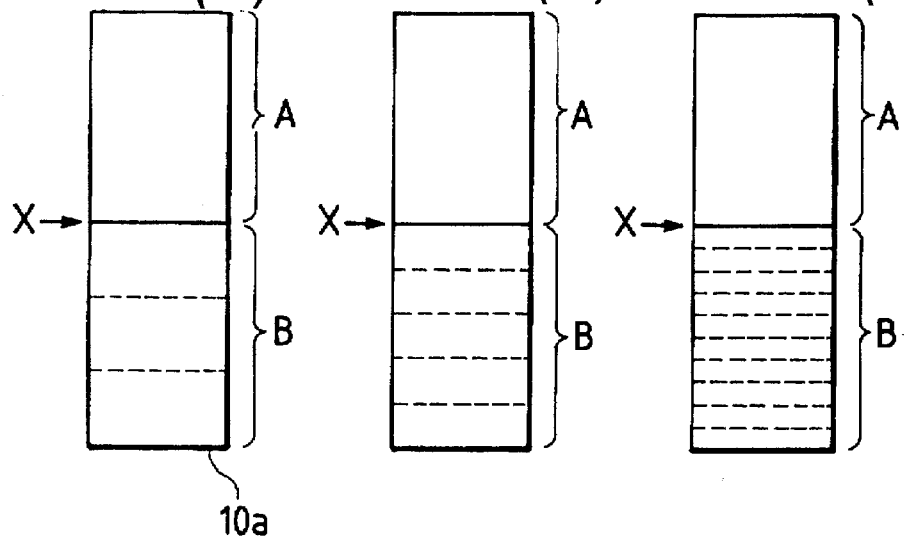
FIGS. 9(a)–9(c) show three examples of memory space division patterns, which correspond to the display contents of FIG. 8.

FIG. 9 illustrates the three possible ways in which the storage space 10a of the memory 10 is divided when each of the three possible standard audio recording interval values is set, by selecting the three possible cursor positions of the display 21 shown in FIG. 8. FIG. 9 applies to the case in which the region allocation pattern (b) of FIG. 5 has been set beforehand.

Figure 10:
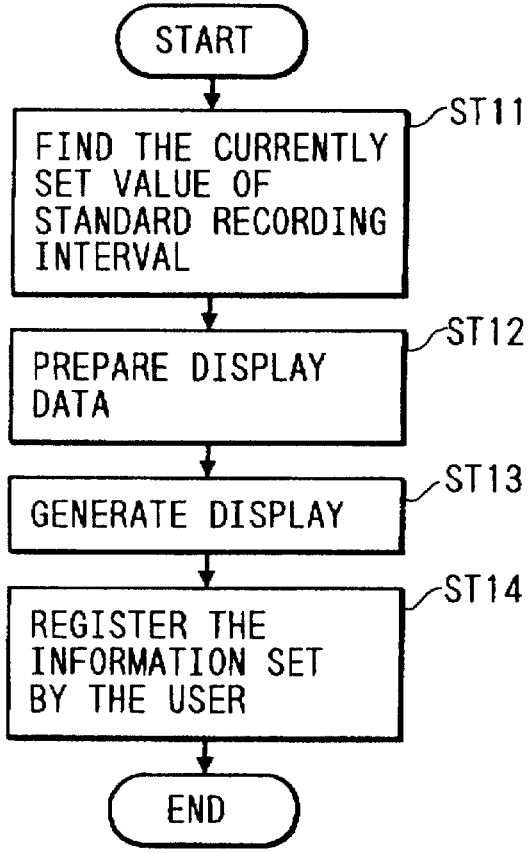
FIG. 10 is a flow diagram illustrating processing that is executed in the boundary address setting mode.
Figure 11:
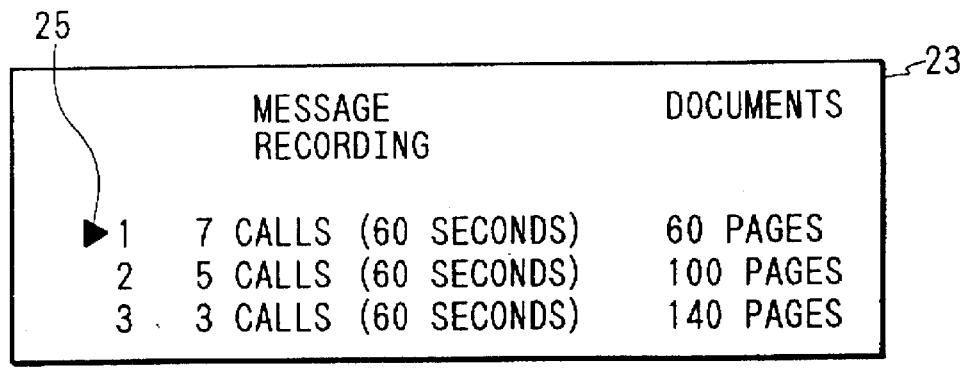
FIG. 11 shows a display which is produced in the boundary address setting mode.

If the first method of memory utilization management described above has been set, then the user can actuate the user operating section 8 to designate a boundary address setting mode of operation of the apparatus. When that mode is designated, the operation sequence illustrated in FIG. 10 is executed. Firstly, the display control section 6b refers to the control table 6a, to find the value of standard audio recording interval that has been set (ST11), then reads out from the setting table 6c the information specifying the maximum number of standard audio recording intervals which can be stored in the audio region B of the memory and the number of standard document pages which can be stored in the video region A of the memory. The control table 6a then generates data for producing the boundary address setting display, and that display is produced on the display section 9 (steps ST12, ST13). FIG. 11 illustrates an example of this boundary address setting mode display, designated by numeral 23, for the case in which the standard audio recording interval of 60 seconds has been set. The first, second and third rows of the display contents, respectively designated as 1, 2 and 3 in FIG. 11, corresponding to the number of standard audio recording intervals and number of standard document pages which can be stored in the memory 10 for each of the three region allocation patterns shown in diagrams (*a*), (*b*) and (*c*) of FIG. 5, respectively. Thus if for example the cursor 25 is set at the uppermost row 1 of the display, and the selector key of the user operating section 8 is then actuated, the region allocation pattern (*a*) of FIG. 5 will be selected. In that case, a condition is set whereby a maximum of 7 calls (telephone messages) can be held stored at the same time in the audio region B of the memory 10, while a maximum of 60 standard document pages can be stored in the video region A.

Thus to set the boundary address, with the display of FIG. 11 being generated, the user actuates the cursor key of the user operating section 8 to move the cursor 25 to the desired row, then actuates the selector key to set the corresponding information. The main control section 6 is thereby notified of the display row that has been selected, i.e. is notified that a region allocation pattern corresponding to that row has been set. The main control section 6 then registers that region allocation pattern in the control table 6*a*, and at the same time reads out from the setting table 6*c* the boundary address X which corresponds to that region allocation pattern, and registers that address in the management table 11*a* of the memory control section 11 (step ST14).

Figure 12:
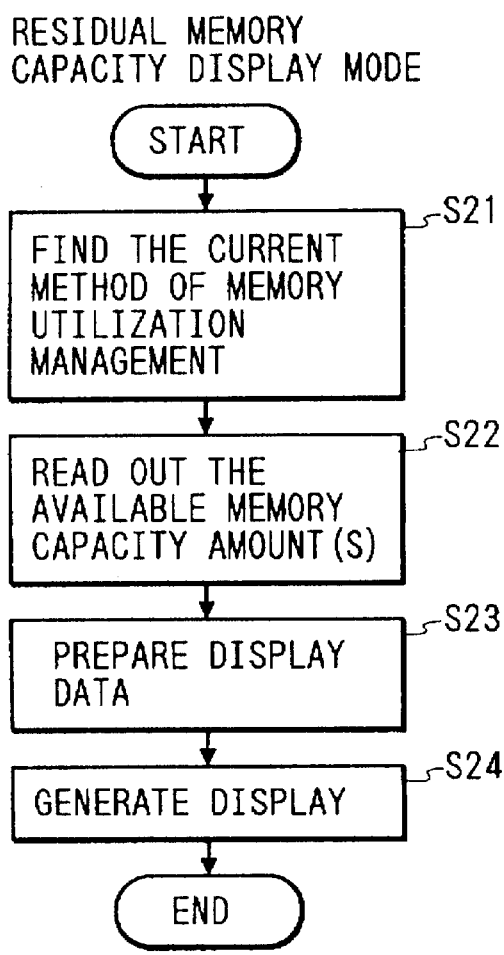
FIG. 12 is a flow diagram illustrating processing that is executed in the residual memory capacity display mode.

The displaying of residual memory capacity will now be described. When the user actuates the user operating section 8 to designate the residual memory capacity mode, the sequence of operations illustrated in the flow diagram of FIG. 12 is executed. Firstly, the display control section 6*b* refers to the control table 6*a*, to find the method of memory utilization management that is currently set, and (if the first method of memory utilization management described hereinabove has been set) the region allocation pattern that has been set (step S20), then reads out from the memory control section 11 the respective amounts of residual memory capacity for the video region and the audio region of the memory 10 (step S21). If however it is found that the second method of memory utilization management described above has been set, so that the memory space 10*a* is not divided into a video region and audio region, then the total residual memory capacity of the memory 10 is obtained from the memory control section 11 in step S21. The size of of the audio data unit data, i.e. the amount of data of the standard audio recording interval which is currently set, and the size of the of video data unit, i.e. the amount of data in a standard document page, are then read out from the setting table 6*c*, and the residual audio data memory capacity is then calculated as a number of standard audio recording intervals (i.e. corresponding to a number of incoming telephone calls) and the residual memory capacity for video data is calculated as a number of standard document pages (step S22). Using the results thus obtained, residual memory capacity display data are generated, and are displayed by the display section 9 (steps S23, S24).

Figures 5A, 5B, 5C:
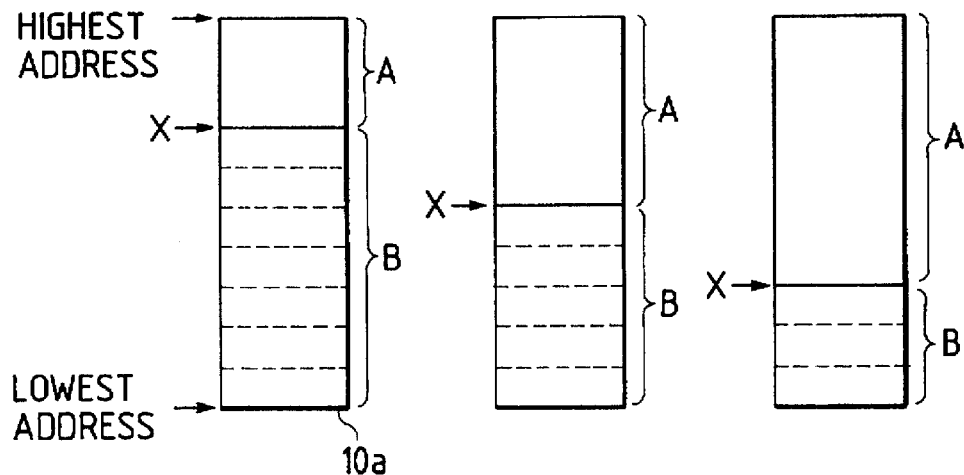
FIGS. 5(a)–5(c) illustrate three types of memory space division patterns.

Referring again to the example of FIG. 3, it is assumed in that example that the region allocation pattern (*b*) of FIG. 5 has been set, that the standard audio recording interval value of 60 seconds has been set, and that the first method of memory utilization management described above has been set, with the video region A of the memory space 10*a* having stored therein the set of video data $a_1$ in addresses which extend from the highest address towards the boundary address X. It will be further assumed that the remaining space in the video region A is equal to 60 standard document pages. Since the audio region B has stored therein the two sets of audio data $b_1$ and $b_2$, each corresponding to one standard audio recording interval, the remaining capacity of the audio region B is equal to three standard audio recording intervals (i.e. three more telephone messages can be stored).

In such a case, the residual memory capacity display produced by the display section 9 will be as designated by numeral 26 in FIG. 13.

If the second method of memory utilization management described above has been set, so that the memory space is not divided into an audio region and video region, and a standard audio recording interval value of 60 seconds has been set, and further assuming that as shown in FIG. 4 the sets of video data $a_1$, $a_2$ are already stored in the memory together with the sets of audio data $b_1$, $b_2$, $b_3$, and also that the residual memory capacity can be expressed either as audio data equal to a total of 4 standard audio recording intervals (i.e. corresponding to 4 telephone messages), or as video data equal to a total of 80 standard document pages, then the residual memory capacity which will be produced by the display section 9 will be as designated by numeral 27 in FIG. 14.

It should be noted that it is not absolutely necessary for the standard audio recording interval setting mode and the boundary address setting mode to be mutually independent. For example it can be arranged that, after setting in the the standard audio recording interval setting mode has been completed, the boundary address setting mode is automatically entered. The converse arrangement would also be possible.

It would also be possible to omit the number of standard document pages from the standard audio recording interval setting mode display.

Furthermore it would be possible, for the standard audio recording interval setting mode display and the boundary address setting mode display, to divide each of these into a plurality of display portions, which successively appear in response to successive switch actuations by the user.

The present invention has been described in the above for the case in which the memory 10 is used only to store received audio data and video data that are received or are to be transmitted. However it would be equally possible to modify the above embodiment such that the memory 10 is also used to store audio data that are to be transmitted, i.e. as an answer, in response to a received telephone call.

As will be clear from the above description of the preferred embodiment, the following effects are obtained by the present invention:

(1) Residual memory capacity values are displayed as a number of standard document pages in the case of video data, and as a number of telephone calls, in the case of audio data. Thus it is easy for an ordinary user of the apparatus, without specialized knowledge, to check on the amount of information which can still be stored in the apparatus.

(2) Since the total memory capacity values for the video region and audio region of the memory space can be respectively displayed as a number of standard document pages and number of telephone calls, when the memory space is divided into a video region and audio region, an ordinary user without specialized knowledge can easily judge whether or not the current setting of the boundary address X is suitable, and can immediately see what effect will be produced by a change in the boundary address (i.e. change in the region allocation pattern). If the boundary address is found to be unsuitable it can be easily changed by the user, using the boundary address setting mode.

(3) The present invention overcomes the problem of a prior art apparatus of this type, whereby the memory must always be divided into two a video region and audio region each having a fixed capacity, so that when the residual memory capacity of the video region is insufficient and there is available memory capacity in the audio region, it is usually not possible to use that capacity for storing new video data. With the present invention, the user can select the second method of memory mangement utilization (in which the memory space is not fixedly divided into audio and video data storage regions) to thereby eliminate such a problem. The memory can thereby be used with maximum efficiency.

(4) In the boundary address setting mode, respective combinations of storage capacity values for the video region and audio region which will result from selection of respective boundary addresses are displayed, in units of document pages and telephone calls. The ordinary user can thereby easily judge what will be an appropriate setting for the boundary address (i.e. region allocation pattern).

(5) In the recording interval setting mode, the user can select one of a plurality of predetermined standard audio recording intervals, and for each of these standard audio recording intervals, the corresponding number of received messages which can be stored in the memory is displayed, expressed as a number of telephone calls. Thus, the user can easily set the most appropriate value of standard audio recording interval.

It can thus be understood that the present invention greatly increases the ease of use and efficiency of use of a data communication apparatus such as a facsimile apparatus having an audio data recording capability.

What is claimed is:

1. In data communication apparatus including communication means for transmitting and receiving video data and audio data, said video data being derived from documents, a memory for storing at least video data and audio data received by said communication means, memory control means for executing management of utilization of said memory and for controlling data write and read operations of said memory, and data display means;

the improvement comprising display control means for controlling said data display means to display first memory capacity information representing an amount of capacity available in said memory for storing video data and second memory capacity information representing an amount of capacity available in said memory for storing audio data, said display control means comprising means for expressing said first memory capacity information as a number of first data units, each of said first data units consisting of an amount of data corresponding to one standard document page, and for expressing said second memory capacity information as a number of second data units, each of said second data units consisting of an amount of data corresponding to one fixed-duration telephone message, and means for controlling said display means to display said number of first data units and number of second data units, wherein a memory space of said memory is divided into a video region which is reserved for storing video data and an audio region which is reserved for storing audio data, with a boundary between said video region and audio region being defined by a boundary address, and wherein said first memory capacity information is an amount of capacity of said video region and said second memory capacity information is an amount of capacity of said audio region, further comprising means for establishing a boundary address setting mode of operation wherein one of a plurality of respectively different values of said boundary address can be selectively established by a user, and wherein said display means is controlled to display during said boundary address setting mode, for each of said plurality of boundary address values, a corresponding amount of capacity of said video region, expressed as a number of said first data units corresponding to document pages, and a corresponding amount of capacity of said audio region, expressed as a number of said second data units corresponding to telephone messages, said display means being further controlled to indicate one of said boundary address values which is currently selected.

2. A data communication apparatus according to claim 1, further comprising means for establishing a residual capacity display mode of operation wherein an amount of capacity that is currently vacant in said video region is displayed in said first data units corresponding to standard document pages and an amount of capacity that is currently vacant in said audio region is displayed in said second data units corresponding to telephone messages.

3. A data communication apparatus according to claim 1, wherein said second data units corresponding to telephone messages respectively correspond to standard recording intervals for storing audio data in said memory, further comprising means for establishing a recording interval setting mode of operation wherein one of a plurality of respectively different values of said standard recording intervals can be selectively established by a user, wherein said display means is controlled by said display control means to display during said recording interval setting mode, in correspondence with each of said different standard recording interval values, a corresponding value of said second memory capacity information, expressed as a number of said second data units corresponding to telephone messages, and to display an indication of one of said standard recording interval values which is currently selected.

4. In a data communication apparatus including communication means for transmitting and receiving video data and audio data, said video data being derived from documents, a memory for storing at least video data and audio data received by said communication means, memory control means for executing management of utilization of said memory and for controlling data write and read operations of said memory, and data display means;

the improvement comprising display control means for controlling said data display means to display first memory capacity information representing an amount of capacity available in said memory for storing video data and second memory capacity information representing an amount of capacity available in said memory for storing audio data, said display control means comprising means for expressing said first memory capacity information as a number of first data units, each of said first data units consisting of an amount of data corresponding to one standard document page, and for expressing said second memory capacity information as a number of second data units, each of said second data units consisting of an amount of data corresponding to one fixed-duration telephone message, and means for controlling said display means to display said number of first data units and number of second data units, wherein video data which are successively written into said memory are written into addresses which successively change in a direction from a first one of highest address and a lowest address of said memory towards a second one of said highest and lowest addresses, and wherein audio data which are successively written into said memory are written into addresses which successively change in a direction from said second one of said highest and lowest addresses of said memory towards said first one of said highest and lowest addresses.

5. A data communication apparatus according to claim 4, further comprising means for establishing a residual capacity display mode of operation wherein a total amount of capacity that is currently vacant in said memory is displayed in said first data units corresponding to standard document pages and also in said second data units corresponding to telephone messages.

6. In a data communication apparatus including communication means for transmitting and receiving video data and audio data, said video data being derived from documents, a memory for storing at least audio data received by said communication means, memory control means for executing management of utilization of said memory and for controlling data write and read operations of said memory, data display means, and display control means controlling said data display means to display memory capacity information representing an amount of capacity of said memory which can be used for storing audio data;

the improvement whereby said display control means functions to express said memory capacity information as a number of audio data units, each of said audio data units consisting of an amount of data representing one fixed-duration telephone message, and to control said display means to display said number of audio data units as a number of said telephone messages, wherein said second data units corresponding to telephone messages respectively correspond to standard recording intervals for storing audio data in said memory, further comprising user operated means for selectively establishing one of a plurality of respectively different values of standard recording intervals by a user, wherein said display means is controlled by said display control means to display, in response to selection of each said different standard recording interval value, a corresponding different value of said second memory capacity information, expressed as a number of telephone messages of each said different standard recording interval, and to display an indication of one of said standard recording interval values which is currently selected.

7. In a data communication apparatus including communication means for transmitting and receiving video data and audio data, said video data being derived from documents, a memory for storing at least audio data received by said communication means, memory control means for executing management of utilization of said memory and for controlling data write and read operations of said memory, data display means, and display control means controlling said data display means to display memory capacity information representing an amount of capacity of said memory which can be used for storing audio data;

the improvement whereby said display control means functions to express said memory capacity information as a number of audio data units, each of said audio data units consisting of an amount of data representing one fixed-duration telephone message, and to control said display means to display said number of audio data units as a number of said telephone messages, further including an audio voice message receiver;

wherein said memory stores audio data received by said audio voice message. receiver and said memory capacity information represents an amount of capacity of said memory for storing messages received by said audio voice message receiver, whereby said display control means operates to express said capacity of said memory for storing messages received by said audio voice message receiver in the audio data units of fixed-duration telephone messages.

8. A data communication apparatus according to claim 7, wherein said second data units corresponding to telephone messages respectively correspond to standard recording intervals for storing audio data in said memory, further comprising user operated means for selectively establishing one of a plurality of respectively different values of standard recording intervals by a user, wherein said display means is controlled by said display control means to display, in response to selection of each said different standard recording interval value, a corresponding different value of said second memory capacity information, expressed as a number of telephone messages of each said different standard recording interval, and to display an indication of one of said standard recording interval values which is currently selected.

* * * * *